May 6, 1969

J. W. TIMMERMAN, JR 3,443,115

MEANS FOR PARALLELING DIRECT CURRENT
SOURCES HAVING DIFFERENT OUTPUT
CHARACTERISTICS

Filed June 15, 1966

Inventor
Julius W. Timmerman, JR
By R J Falkowski
Attorney

United States Patent Office 3,443,115
Patented May 6, 1969

3,443,115
MEANS FOR PARALLELING DIRECT CURRENT SOURCES HAVING DIFFERENT OUTPUT CHARACTERISTICS
Julius W. Timmerman, Jr., Brookfield, Wis., assignor to Allis-Chalmers Manufacturing Company, Milwaukee, Wis.
Filed June 15, 1966, Ser. No. 557,668
Int. Cl. H02j 9/02
U.S. Cl. 307—66       10 Claims

ABSTRACT OF THE DISCLOSURE

Means for paralleling a fuel cell and a battery to power an electrically driven vehicle such as a fork lift truck having widely varying current requirements includes means for permitting current flow from battery to load only when the current level is sufficiently high to cause the fuel cell voltage to fall below that of the battery and means for disconnecting the fuel cell from battery and load when the fuel cell voltage falls below a predetermined level. During periods of operation when the fuel cell voltage exceeds that of the battery, a diode is conductive to charge the battery from the fuel cell.

---

This invention relates to means for paralleling two or more sources of direct current having different volt-ampere characteristics, particularly it relates to means for paralleling power sources such as a fuel cell and a battery to energize a load having greatly varying current requirements.

The development of electrically powered vehicles has increased the need for efficient and inexpensive power sources. Fuel cell systems for such vehicles are being developed because a fuel cell has some desirable characteristics for this type of operation. However, fuel cell systems tend to become expensive for certain types of vehicles, such as fork lift trucks, that have large variations in current requirements with high peak current requirements of short duration. By paralleling fuel cells with batteries, which are able to furnish high currents for short periods, more efficient operation at a lower cost can be obtained. This invention provides an effective means for paralleling a fuel cell and battery to power such a vehicle or load.

The objects of this invention are: to provide a new and improved power source for an electric vehicle; to provide new and improved means for paralleling two different volt-ampere characteristic type direct current sources such as a fuel cell and battery; and to provide electrical power means for vehicular applications at relatively low cost.

Figure 1:
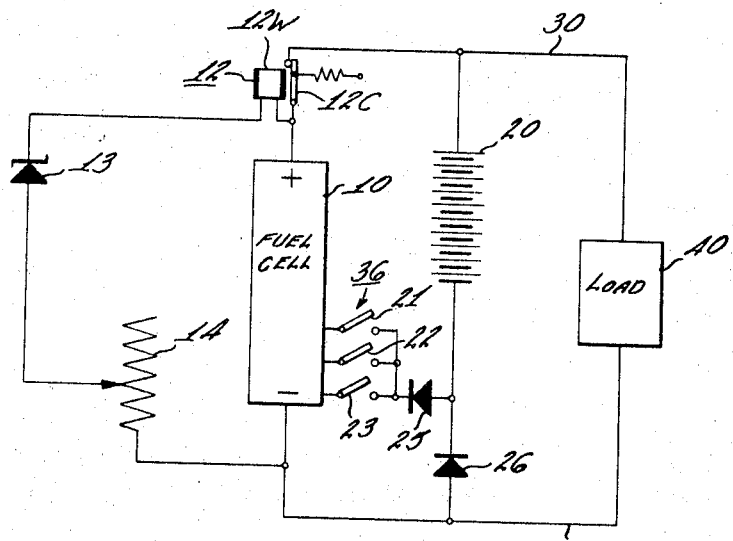
FIG. 1 is a schematic drawing of a parallel fuel cell and battery circuit connected to a load in accordance with this invention.

Referring to FIG. 1, a fuel cell 10 and a battery 20 are connected in parallel to furnish power to a load 40. Load 40 may be any load requiring the current characteristics furnished by this circuit but in most cases would be the control system and motor for vehicles such as electrically powered fork lift trucks. The control system could be a resistor type control circuit or it could be a pulse modulation control circuit. Whichever control system is used, the current supply problems are essentially the same.

Means responsive to the voltage of the fuel cell are provided for disconnecting the fuel cell from the battery and the load when the fuel cell voltage drops below a preselected level. These means comprise a relay 12 having a winding 12w and a contact 12c, a Zener diode 13, and a potentiometer 14 connected between fuel cell 10 and load 40.

Means are provided for connecting the fuel cell to charge the battery when the voltage of a tap of the fuel cell, selected at some voltage level less than the maximum fuel cell voltage, exceeds the battery voltage by a preselected amount. These means comprise a switching and selecting means 36, including switches 21, 22 and 23, connected to enable selection of the voltage level tapped from the fuel cell, and a diode 25.

Figure 3:
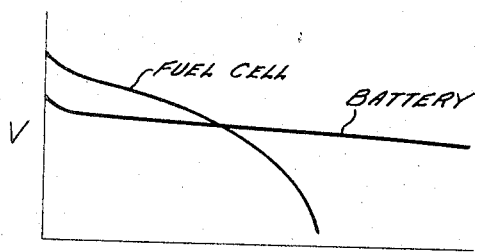
FIG. 3 is a graph of the typical voltage-current characteristics of a fuel cell and battery.

Means are provided for connecting the battery to the load only when the battery voltage exceeds the fuel cell voltage. These means include conductors 30 and 32, which also connect the fuel cell to the load, and a diode 26. FIG. 3 shows a typical volt-amp curve for a fuel cell and battery connected alone in a circuit. It shows how the fuel cell voltage rapidly drops at higher currents. At the higher current levels, the battery therefore furnishes most of the current to the load.

In the operation of the circuit, fuel cell 10 furnishes power to load 40 under normal load conditions along conductors 30 and 32. During periods of high current, the voltage across the fuel cell drops. When the voltage at conductor 32 drops below the voltage of the negative terminal of the battery, diode 26 is forward biased and the battery contributes current to the load. In this general range of high load conditions, both the battery and fuel cell are contributing current to load 40. If the current required for load 40 becomes very high, which generally occurs only for short intervals, battery 20 will furnish substantially all the current. The characteristics of fuel cell 10 and battery 20 are selected and the circuit is designed to meet the requirements of load 40 with the most economical relationship between the sizes of fuel cell 10 and battery 20. The point of theoretical crossover of the fuel cell and battery volt-amp curve as shown in FIG. 3 can be selected for a particular application by using selected fuel cell and battery sizes.

During periods of relatively low current needs, battery 20 is charged through diode 25. As long as the voltage at the tap of the fuel cell selected by switching means 36 is more negative than the negative terminal of the battery, diode 25 conducts and charging current flows to the battery. When the potential of the negative terminal of battery 20 substantially equals or is greater than the voltage at the tap of the fuel cell, diode 25 is cut off and no charging current flows. Switching means 36 can be arranged to provide several taps, shown as switches 21, 22 and 23, depending on the charge level desired for battery 20 and the expected load characteristics. Switching means 36 could also be a selecting means that sends the charge condition of the battery and charges its tap selection automatically.

The means for disconnecting the fuel cell operates to keep contact 12c of relay 12 closed as long as the fuel cell voltage is above the preselected level. When the voltage drops below this level, contact 12c opens thereby preventing damage to the system that could result from low voltage or to the fuel cell from a reverse voltage provided by the battery, as would occur during starting of the system. The level at which contact 12c opens is determined by the characteristics of Zener diode 13, the adjustment of potentiometer 14 and the characteristics of relay 12.

Figure 2:
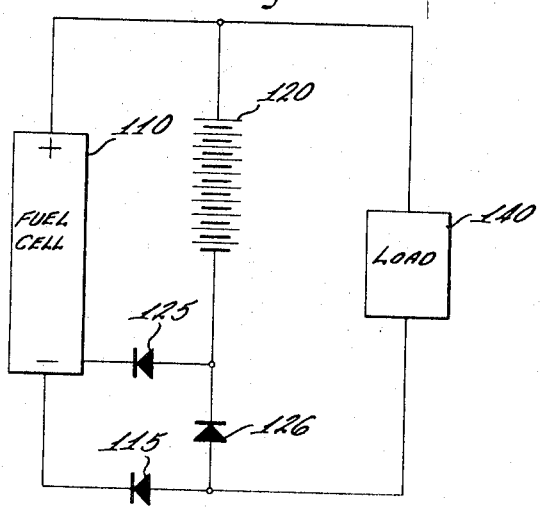
FIG. 2 is a drawing of a variation of the general circuit shown in FIG. 1.

FIG. 2 shows a circuit similar to that of FIG. 1 with a fuel cell 110, a battery 120 and a load 140. A charging diode 125 enables selective charging of battery 120 and a diode 126 allows the battery to contribute current through the load when the fuel cell voltage would drop below the battery voltage in the same general manner as the circuit shown in FIG. 1.

The means for disconnecting shown in FIG. 2 comprises a diode 115 connected between the negative terminal of fuel cell 110 and the battery and load. This diode has the effect of disconnecting fuel cell 110 from the load and from the battery when the fuel cell voltage drops below the battery voltage and the diode is reverse biased. The circuit in FIG. 2 could be used when the desired primary purpose is to prevent a reverse voltage across the fuel cell greater than the fuel cell output voltage.

In describing the invention, the preferred embodiment has been shown and described, but it is obvious to one skilled in the art that there are many variations, combinations, alterations and modifications that may be made without departing from the spirit of the invention, or from the scope of the appended claims.

The embodiments of the invention in which an exclusive property or privilege is claimed are defined as follows:

1. Power means for furnishing electrical power from a fuel cell and a battery to a load having relatively large variations in current requirements, said means comprising:
   means for connecting the fuel cell and battery in parallel with each other to furnish power to the load;
   means responsive to the voltage of the fuel cell for disconnecting the fuel cell from the battery and the load when the fuel cell voltage drops below a preselected level;
   means for connecting the fuel cell to charge the battery only when the fuel cell voltage exceeds the battery voltage by at least a preselected amount; and
   means for connecting the battery to the load only when the battery voltage exceeds the fuel cell voltage.

2. Power means according to claim 1 wherein said means for disconnecting comprises a relay having normally open contacts connected in circuit between the fuel cell and the battery and load and a relay winding connected in series with the fuel cell, a potentiometer, and a Zener diode connected in the reverse biased direction.

3. Power means according to claim 1 wherein said means for connecting the fuel cell to charge the battery comprises a diode connected between a tap of the fuel cell at a selected voltage and a battery terminal with said diode connected in a direction to be conductive when the voltage at the tap exceeds the battery voltage.

4. Power means according to claim 1 wherein said means for connecting the battery to the load comprises a diode connected between a terminal of one polarity of the battery, a terminal of the same polarity of the fuel cell with said fuel cell terminal connected directly to the load and with said diode connected in a direction to be conductive when the battery voltage exceeds the fuel cell voltage.

5. Power means according to claim 1 wherein said means for disconnecting comprises a diode connected between a terminal of one polarity of the fuel cell and a terminal of the battery of the same polarity with said diode connected to block current when the fuel cell voltage is less than the battery voltage.

6. Power means according to claim 2 wherein said means for connecting the fuel cell to charge the battery comprises a diode connected between a tap of the fuel cell at a selected voltage and a battery terminal with said diode connected in a direction to be conductive when the voltage at the tap exceeds the battery voltage.

7. Power means according to claim 2 wherein said means for connecting the battery to the load comprises a diode connected between a terminal of one polarity of the battery, a terminal of the same polarity of the fuel cell with said fuel cell terminal connected directly to the load and with said diode connected in a direction to be conductive when the battery voltage exceeds the fuel cell voltage.

8. Power means according to claim 6 wherein said means for connecting the battery to the load comprises a diode connected between a terminal of one polarity of the battery, a terminal of the same polarity of the fuel cell with said fuel cell terminal connected directly to the load and with said diode connected in a direction to be conductive when the battery voltage exceeds the fuel cell voltage.

9. Power means according to claim 3 wherein said means for disconnecting comprises a diode connected between a terminal of one polarity of the fuel cell and a terminal of the battery of the same polarity with said diode connected to block current when the fuel cell voltage is less than the battery voltage.

10. Power means according to claim 9 wherein said means for connecting the battery to the load comprises a diode connected between a terminal of one polarity of the battery, a terminal of the same polarity of the fuel cell with said fuel cell terminal connected directly to the load and with said diode connected in a direction to be conductive when the battery voltage exceeds the fuel cell voltage.

References Cited

UNITED STATES PATENTS

| | | | |
|---|---|---|---|
| 940,008 | 11/1909 | Gugler | 320—3 |
| 979,154 | 12/1910 | Gugler | 320—3 |
| 3,317,809 | 5/1967 | Bowers et al. | 307—66 X |

ROBERT K. SCHAEFER, *Primary Examiner.*

H. J. HOHAUSER, *Assistant Examiner.*

U.S. Cl. X.R.

320—3, 14